Dec. 3, 1957  J. L. ADCOCK  2,815,435
SPARK MACHINING APPARATUS
Filed Aug. 6, 1954  2 Sheets-Sheet 1
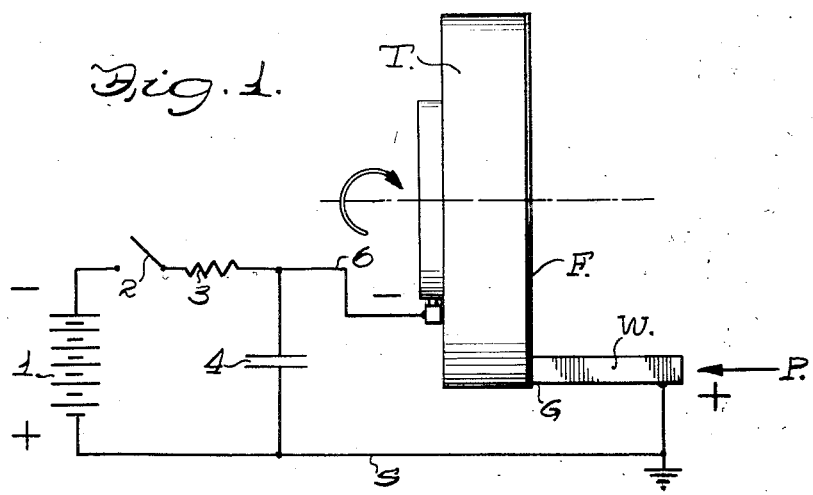
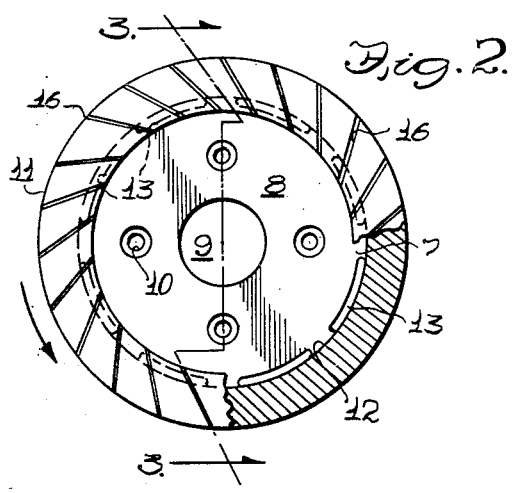
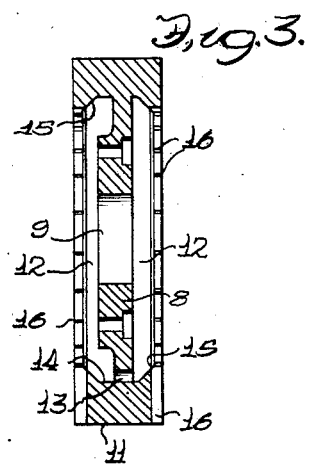
Inventor
John Lewis Adcock
Carlson, Pitzner, Hubbard, & Wolfe
Atty's Dec. 3, 1957 — J. L. ADCOCK — 2,815,435

SPARK MACHINING APPARATUS

Filed Aug. 6, 1954 — 2 Sheets-Sheet 2

Inventor
John Lewis Adcock
Carlson, Pitzner, Hubbard, & Wolfe
Atty's

United States Patent Office 2,815,435
Patented Dec. 3, 1957

2,815,435

SPARK MACHINING APPARATUS

John Lewis Adcock, Hillingdon, England, assignor, by mesne assignments, to Firth Sterling Inc., Pittsburgh, Pa., a corporation of Pennsylvania Application August 6, 1954, Serial No. 448,273

Claims priority, application Great Britain August 7, 1953

2 Claims. (Cl. 219—69)

This invention relates to method and apparatus for electrically dislodging particles from an electrically conductive workpiece by a series of over-voltage initiated, short, time-spaced spark discharges. The invention is concerned more specifically with a novel method and apparatus for such spark machining, the art of so removing metal also being sometimes termed "spark cutting," "spark erosion," or "electro-erosion."

Spark cutting has found particular utility for machining extremely hard materials such as tungsten and other carbides, hard steel alloys, and the like. The cutting or eroding action is provided by the spark-over discharge in the spark gap defined between the closely spaced facing surfaces of a workpiece and an electrode which serves as a tool, although such a tool does not contact the workpiece nor does its own hardness control the machining operation. The sparks are of very short duration and high energy content, the discharge energy being usually provided by a storage capacitor coupled to the spark gap electrodes. These discharges take place through a fluid having dielectric properties such as kerosene which at all times fills the gap, usually by immersion of the workpiece in a fluid reservoir pumping the fluid through the gap. During application of the spark discharges, minute particles of the workpiece are successively dislodged therefrom in the region opposite the active end of the electrode tool to generate the machined contour in the workpiece. As the machining action progresses, it has generally been necessary to maintain the spacing between the workpiece and the electrode tool defining the spark gap at a constant distance by an electrode feed mechanism. In many instances, the feed mechanism and control desirably take the form of an electrical servo-mechanism for maintaining the desired spacing to avoid either closing the gap and short circuiting the electrodes or increasing the gap distance so far that no over-voltage initiated discharge can occur.

For many purposes, however, it is required that the workpiece be more freely manipulated with respect to the tool, preferably by manipulation of the workpiece itself, as for a trimming operation. It is also desired for some operations that the spark gap spacing be controlled with feed pressure applied either manually or by simple mechanical means.

It is therefore an object of this invention to provide a simple method of spark machining conductive workpieces with a manual or with a very simple mechanical feed system.

It is likewise an object of this invention to provide a spark machining apparatus in which the spark gap spacing may be very simply and easily maintained.

It is a further object of the invention to provide in apparatus of the nature described, an electrode tool and dielectric fluid which cooperate to maintain the spark gap spacing with respect to a workpiece.

It is another object to provide an electrode tool incorporating means for maintaining the dielectric fluid supply.

It is still another object to provide in a spark machining apparatus a dielectric fluid for maintaining the spark gap spacing.

Other objects and advantages will become apparent as the following detailed description proceeds, taken together with the accompanying drawings wherein:

Figure 1 is a semi-schematic representation of the spark powering circuit for a spark machining apparatus embodying my invention.

Fig. 2 is a side elevation in partial section of one form of rotary electrode suitably employed in apparatus incorporating my invention.

Fig. 3 is a cross section along the line 3—3 of Fig. 2.

Fig. 9 is a fragmentary front view of a modified rotary electrode.

Fig. 10 is a sectional view of the electrode of Fig. 9.

Figure 4:
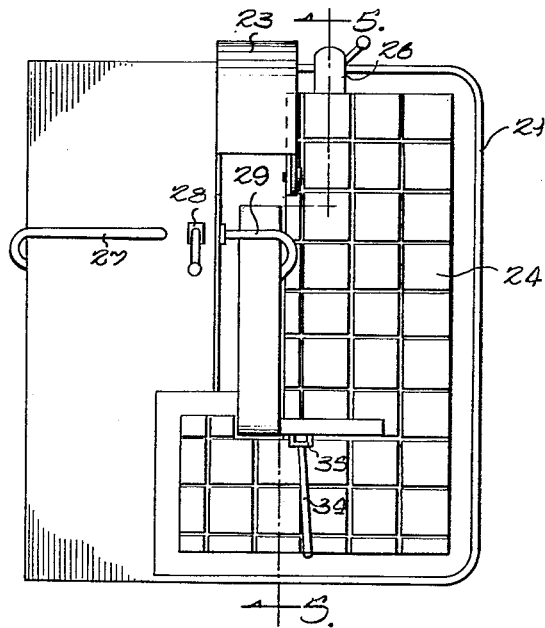
Fig. 4 is a plan view of an apparatus embodying the invention and incorporating the rotary electrode of Figs. 1 and 2.

While the invention is susceptible of various modifications and alternative constructions, there is shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Referring first to the spark gap and spark powering circuit shown in Fig. 1, the electrode tool T suitably takes the form of a rotary wheel or disk having an annular working or active spark gap surface on either side near its periphery. The workpiece W is represented as a block or bar of tungsten carbide or other conductive material and may itself be a tool being formed or sharpened for conventional cutting of softer metals. This workpiece is urged under a pressure P toward a moving peripheral side portion of the rotary disk T, but at all times is slightly spaced from it to define the spark gap G. A dielectric fluid F fills the gap and serves both as a self-restoring ionizable medium and also as a vehicle for carrying the dislodged workpiece particles from the spark gap. In the apparatus incorporating my invention, the dielectric fluid introduced by the movement of the electrode tool T across the workpiece is present as a film of a liquid lubricant or oil of appreciable viscosity. This film itself maintains a spark gap spacing under substantially constant workpiece feed pressure.

The spark powering circuit, which may be any of known circuits for spark machining, suitability takes the form shown in Fig. 1 in which the storage capacitor is periodically charged from an energy source and discharged across the spark gap defined between the tool T and workpiece W. A direct current energy source is conventionally indicated as a battery 1 connected through the starting switch 2 and a charging resistor 3 to the terminals of the capacitor 4. The capacitor is in turn directly connected through low inductance discharge conductors to the spark gap electrodes, the workpiece W being connected to the positive terminal through conductor 5 to serve as the gap anode and the tool T being connected to the negative terminal through conductor 6 to serve as the gap cathode. In the particular circuit shown, after closing of the switch 2 the capacitor is charged to a voltage level approaching that of the source 1 through the charging resistor 3. When the voltage becomes high enough to cause a disruptive breakdown of the liquid filled gap, the high spark current flow rapidly discharges the capacitor, causing a very high density discharge current in the electrodes at the spark termini. This process automatically repeats itself at a rate largely controlled by the time constant RC of the charging circuit, where R is the resistance and C is the capacitance.

Without going further into the theory at this time, it is believed that the spark machining action is due to electric field forces associated with the electron current density at the spark anode terminus, each spark removing one or more particles. The spark-over normally occurs across the narrowest portion of the spark gap at any instant, the successive sparks being necessarily time-spaced in order that the spark may preserve its identity as such rather than degenerate into a heating arc. While the cathodic electrode disk T is subject to some erosion, it is not subject to the same spark machining action as the anodic workpiece W, and the effect on the machining accuracy is minimized since the working or active spark gap surface of the disk is distributed along the length of the annular path near its periphery.

The tool T by reason of its effectively transverse motion across the surface being machined conveys with it a supply of a clean dielectric oil F as a film between the tool and workpiece. Since the liquid has an appreciable viscosity, the gap is automatically maintained thereby upon application of a small feed pressure to the workpiece W. The machined particles which are removed by each spark are entrained in the liquid and are swept out of the spark gap with the liquid by the rotary motion of the electrode wheel. It will be recognized of course that should the removed particles remain in the spark gap, short circuiting might occur and the sparks might degenerate into conventional heating arcs. This type of "outside machining" operation in which successive active surfaces of the electrode tool pass in and out of the spark gap relation with the workpiece contrasts with the "inside" type of spark machining wherein an electrode tool in an operation similar to boring or drilling remains in the bore as it is progressively formed.

Referring further to Figs. 2 and 3, the electrode tool there shown in detail comprises a disk 7 which may be suitably made of cast iron although other softer conductive materials such as brass may also be employed. The disk includes a web or central portion 8 in which is formed a central opening 9 for reception of a driving member which is secured to the web by screws inserted in bores 10. The thickness of the web is less than that of the outer portion 11 of the disk to in effect define a peripheral recess 12 on each side of the web. These recesses communicate with each other through web slots or ports 13. Each side of the larger thickness peripheral portion 11 has a flat annular working surface 14 as a large area renewable electrode surface.

To provide a pocket or reservoir for the dielectric fluid as further shown in Fig. 3, the inner surfaces 15 of the peripheral disk portion 11 are concave and increase in radial spacing from the disk center in the vicinity of the periphery of the web 8. In effect, a chamfer or bevel is provided which would confine a quantity of liquid within the disk recesses against centrifugal forces due to disk rotation. In order to supply the liquid to the annular surfaces 14, the grooves 16 are provided across each annular width. These open ducts are preferably equidistantly spaced but are obliquely alined instead of being radially disposed. The grooves embouch upon the inclined inner surfaces 15 of the large diameter portion of the disk and define notches therein through which a fluid disposed in the inner annular reservoir may flow into the grooves 16. The electrode disk as oriented in Fig. 2 is designed for counterclockwise rotation. In this way the rapid expulsion of the dielectric fluid from the ends of the grooves 16 by centrifugal force is reduced and the flow of fresh or clean fluid from the grooves and over the annular surfaces 14 between them is enhanced without requiring restriction of the drain paths provided by the grooves.

Figure 5:
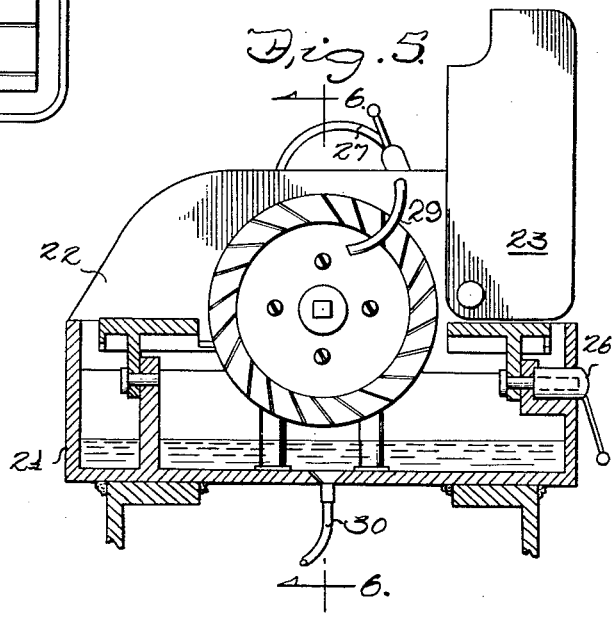
Fig. 5 is a sectional front view along the line 5—5 of Fig. 4.
Figure 6:
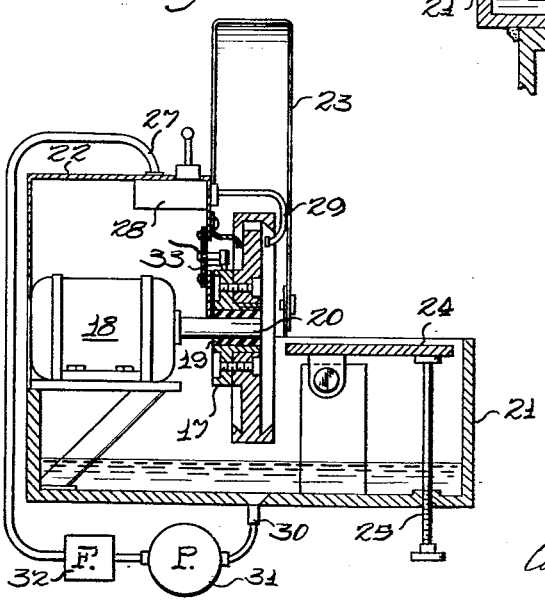
Fig. 6 is a sectional view along the line 6—6 of Fig. 5.

The electrode disk is suitably rotated and its dielectric fluid supply maintained in the machine illustrated in Figs. 4, 5 and 6. As shown therein, the disk is driven by the coupling member 17 previously mentioned which is secured to one side of the disk as shown in Fig. 6. The coupling is rotated suitably by an electric drive motor 18 secured through an insulating bushing 19 to the motor shaft 20. As previously mentioned, the motor rotates the disk in the direction of the outer radial portions of the grooves or fluid ducts 16. The centrifugal force on the fluid dielectric thus tends to counteract its outward radial flow to control direct radial ejection of the dielectric from the disk grooves.

The disk and the motor are mounted above a fluid drain tank 21 and are enclosed in part by a fixed cover or shield 22. A liftable guard 23 is pivotally attached to the shield 22 to catch drops of the dielectric fluid which fly off the electrode disk as it rotates and also to shield the operator from electrical shock due to the potential on the disk with respect to the tank assembly. For purposes of clarity, the pivoted guard is shown in its lifted position in the drawings. A metal work table 24 is pivotally supported from the tank 21 as particularly shown in Fig. 6. The work table is suitably made angularly adjustable by tilting screw 25 and the lever 26 is suitably employed to clamp the table in place at its pivot so that a workpiece having a reference surface on the table may be presented at the desired angle to the annular surface 14 of the electrode disk tool 7. The table is cut away as particularly shown in Fig. 4 to accommodate the lower portion of the disk electrode 7 without short circuiting or sparking thereto and to provide access to either one of the annular surfaces 14. The table is also shown as provided with drainage grooves for removal of dielectric fluid splashed upon it.

In the system for circulating the fluid dielectric, an inlet hose 27 is connected to an inlet valve 28 mounted on the cover shield 22. The valve regulates the fluid flow to a curved pipe or drip tube 29 extending from the valve and directed inwardly toward one of the recesses 12 of the disk. The fluid after passing into the grooves 16 from whence it spreads over the work surface 14 as a film between the work surface and the workpiece being machined, eventually is thrown off the periphery of the disk and drains into the drain tank 21 below. It is then suitably drained through an outlet hose 30 and returned by a pump 31 through a filter 32 which removes the workpiece particles and other foreign matters to return the cleaned fluid through the inlet hose 27. It should be understood that the pump 31 does not apply presssure to the dielectric film of the spark gap but merely supplies the fluid to the drip tube 29.

The spark gap powering circuit such as that described in connection with Fig. 1 is suitably coupled between the workpiece and the disk. For this purpose a conductor corresponding to the negative discharge circuit conductor 6 is connected to a collecting brush or shoe 33 bearing against an outer cylindrical surface of the disk coupling member 17. A fluid baffle or splash guard member preferably extends from the cover shield 22 to prevent the fluid from splashing back in the direction of the coupling member 17 and the motor 18. The conductive work table 24, and with it the remainder of the machine except for the rotary electrode, is preferably grounded for safety. As it is at a positive potential with respect to the disk 7, it may be considered as connected to the powering circuit through the positive conductor 5 of Fig. 1. In one manner of insuring effective electrical connection with the workpiece shown in Fig. 5, as useful when the workpiece is not held in contact with the table, a flexible cable 34 has one end conductively attached to the table and its other end conductively secured to a permanent magnet 35 which is removably attached to the workpiece shank. It should be noted that the tools involved often have tungsten carbide tips with the shank or the body of the tool made of a magnetic material, usually steel.

As in all spark machining, maintenance of the dielectric fluid in the spark gap is essential and in accordance with the invention the fluid employed is a dielectric liquid having sufficient viscosity to maintain a film of appreciable thickness and thus maintain the spark gap itself when the pressure is applied to the workpiece. Mineral hydrocarbon oils have been found particularly effective, both as a self-restoring ionizable fluid and also as having sufficient viscosity to maintain the film. Such oils, while employed as a self-restoring ionizable liquid dielectric are generally commercially available as motor lubricants since they must have sufficient viscosity to prevent actual engagement of the electrodes, must not corrode the electrodes, and must resist breakdown or deterioration. A viscosity value of about 55 Redwood at 210° F. has been found satisfactory for maintaining suitable film thickness under moderate pressures, but viscosities in a range from about 50 to 105 Redwood at 210° F. are useful. Particular examples of commercial lubricants successfully employed as the dielectric fluid are Wakefield's Castrol XL and Wakefield's Machine Oil R6190.

In operation and in further accordance with the method of the invention, the oil is supplied to the electrode disk through the drip tube 29 and the disk rotation is maintained in the direction of the outer radial portions of the grooves or ducts. A contributory factor necessary for successful operation is the speed of the working surface of the disk, a satisfactory linear speed being about 3500 feet per minute with oil of the viscosity mentioned as the dielectric fluid. Under these conditions the liquid flows from the grooves over the sides of the annular surfaces 14 being continually renewed so that fresh or clean dielectric enters the spark gap as the disk rotates. While the inclination of the ducts with respect to the direction of rotation tends to prevent the liquid from running directly out of the ends of the grooves 16 and to cause it to flow under the workpiece surface, the ducts are still maintained open for drainage of the particle laden or "used" oil.

While the workpiece being shaped, trimmed sharpened, or otherwise machined may be conveniently placed on the work table 24 and urged against the oil film on annular surface 14 on either side of the disk 7 by hand pressure, or even held in the hand above the table surface as may be especially desirable where flexibility in position of the workpiece is desired, it will be appreciated that a reasonable pressure, preferably substantially constant, should be maintained as is consistent with the viscosity of the oil dielectric and the face speed of the annular surface 14 of the wheel or disk. Thus a film thickness of about .003 inch can be readily maintained by moderate pressures. The film thickness is adjustable from a few ten-thousandths of an inch to approximately 0.02 inch, depending upon the sparking voltage and other factors. The operator is able to judge if he is exerting excessive pressure since short circuiting is obvious, or if he is exerting insufficient pressure inasmuch as a regular discharge of the capacitor at or before it reaches the source voltage level is indicated by lowered intensity and frequency of the sound accompanying the repeated spark discharge.

Figure 7:
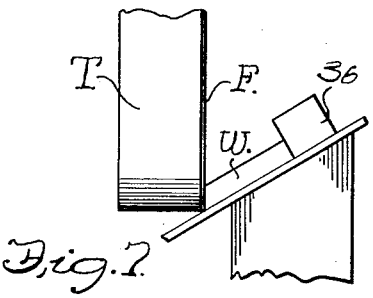
Fig. 7 is a view of apparatus modified for gravitational workpiece feed.

Simple mechanical means may also be utilized for maintaining the spark gap by application of a substantially constant feed pressure. Thus, as shown in Fig. 7, gravity may be relied upon to supply the feed pressure, the main surface of the work table 24 being inclined at a substantial angle with respect to the disk surface 14. With a relatively heavy or massive workpiece slidably positioned on the table, it is urged by its own weight against the wheel surface. An additional heavy block 36 positioned behind the workpiece or above it may be employed to increase the pressure. Various types of slides or guides may be set up for handling workpieces of particular sizes or shapes. It is obvious, of course, that without departing from the spirit of my invention, the disk tool and the workpiece may be arranged in various relative positions to utilize the effects of gravity in providing the machining pressure.

Figure 8:
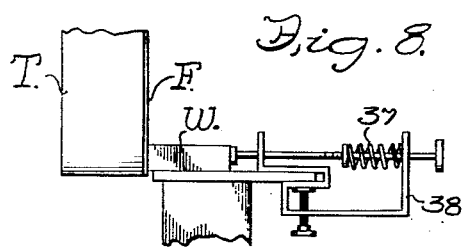
Fig. 8 is a view of apparatus modified for mechanical pressure feed.

Another manner in which the tool pressure may be applied is indicated in Fig. 8 which shows the use of a compression spring 37 to urge the workpiece against the disk surface. The spring is positioned on a bracket 38 fastened to the worktable 24 and its tension is preselected to provide the proper constant pressure. The amount of material removed from the workpiece is small so that no significant spring pressure change is involved. It is apparent that with such a simple feeding means, the apparatus may be readily adapted for mass production or preset sharpening or other machining of a given size tool.

Many modifications of electrodes having a surface moving transversely across the face of the workpiece for carrying continuously replenished gap-spacing dielectric film may be made within the spirit of my invention, the tool electrode of Figs. 9 and 10 being one example. As shown therein, the rotary electrode 7 has bores 39 instead of the grooves 16 to define ducts for the liquid from the recesses 12 in the disk to the outer annular surface 14. In this case the bores extend axially into the disk surfaces 14 and open upon the recesses which carry the liquid during operation. In both this modification and that shown in Figs. 2 and 3 only one side of the disk need be provided with ducts in the event that only one side may be conveniently or economically employed as a working face.

I claim as my invention:

1. In spark machining apparatus of the type having a spark powering circuit for providing a series of short, time-spaced spark discharges through a dielectric fluid between an electrode tool and a conductive workpiece for dislodging workpiece particles therefrom, a reservoir of a dielectric hydrocarbon oil, an electrode wheel mounted for rotation over said reservoir and above the oil level, said wheel having a recessed portion in one surface below a given surface radius and an annular electrode tool working surface beyond said radius, means for directing oil from the reservoir into said recessed portion, the inner terminal radial limit of the recessed portion being greater than said surface radius to form a wheel reservoir for confining liquid against centrifugal force, and said wheel having a plurality of passages defined between the recess and the annular face to provide a flow of the liquid across the surface of the annular face.

2. Apparatus as in claim 1 in which said plurality of passages comprises grooves across said annular face communicating at their inner radial end with said wheel reservoir.

References Cited in the file of this patent

UNITED STATES PATENTS

| 927,164 | Puffer | July 6, 1909 |
| 2,059,236 | Holslag | Nov. 3, 1936 |
| 2,526,423 | Rudorf | Oct. 17, 1950 |
| 2,626,493 | Speicher | Jan. 27, 1953 |

FOREIGN PATENTS

| 637,793 | Great Britain | May 24, 1950 |